Figure 1A:
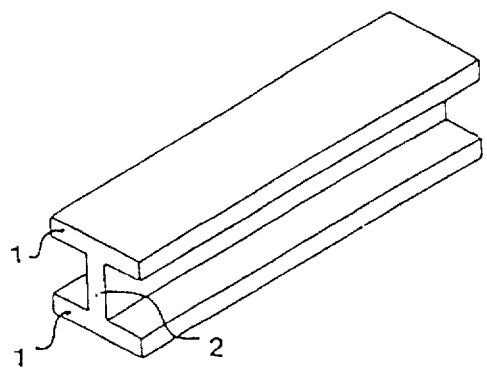

United States Patent [19]
Edgson et al.

[11] Patent Number: 5,783,279
[45] Date of Patent: Jul. 21, 1998

[54] FIBRE PREFORMS FOR STRUCTURAL COMPOSITE COMPONENTS

[75] Inventors: Raymond Edgson; Stephen Temple, both of Cambridge, England

[73] Assignee: Cambridge Consultants Limited, Cambridge, England

[21] Appl. No.: 190,207

[22] PCT Filed: Aug. 19, 1992

[86] PCT No.: PCT/GB92/01525

§ 371 Date: Feb. 21, 1995

§ 102(e) Date: Feb. 21, 1995

[87] PCT Pub. No.: WO93/04224

PCT Pub. Date: Mar. 4, 1993

[30] Foreign Application Priority Data

Aug. 19, 1991 [GB] United Kingdom ............... 9117863

[51] Int. Cl.$^6$ ........................................................ B32B 3/12
[52] U.S. Cl. .......................... 428/116; 139/11; 139/51.1; 139/DIG. 1; 428/902; 442/203; 442/204
[58] Field of Search ...................... 428/116, 225, 428/233, 238, 239, 246, 257, 902; 139/11, 55.1, DIG. 1; 442/203, 204

[56] References Cited

U.S. PATENT DOCUMENTS 289,671  12/1883  Lister et al. .
1,691,195  11/1928  Howard .

(List continued on next page.)

FOREIGN PATENT DOCUMENTS

| 0236500 | of 1987 | European Pat. Off. . |
| 0258102 | 3/1988 | European Pat. Off. . |
| 0286058 | 10/1988 | European Pat. Off. . |
| 0329434 | 8/1989 | European Pat. Off. . |
| 0331310 | 9/1989 | European Pat. Off. . |
| 0426878 | 5/1991 | European Pat. Off. . |
| 8908877 | of 1989 | Germany . |
| 781170 | of 1957 | United Kingdom . |
| 840767 | of 1960 | United Kingdom . |
| 9106421 | 5/1991 | WIPO . |

OTHER PUBLICATIONS

Frank K. Ko. "Three–Dimensional Fabrics For Composites", Drexel Univ. pp. 129–171.
William Watson, "Lappet Weaving and Desinging", Advanced Textile Design, pp. 296–335.
Harry Nisbet, "Tissue, Lappet and Swivel Figuring", Grammar of Textiel Design, pp. 237–255.
Raymond Development Industries, "Integrally Woven Fluted Cove Panel", pp. 1–32, 1961.
McGarth et al, "The Weaving Of Three Dimensional Fabrics For The Aerospace Industry", 12th Nat. Sampe. Symp, 1967.
Faddis et al, "Development Of a Pseudohomogensous, Three–Dimensional, Contineously Woven Composite Material", SME 1972.
Cahuzac et al, "The Automatic Weaving of 3D Contoured Preforms", SAMPLE 1980 pp. 138–143.
Temple, "Large Scale Manufacture of Three–Dimensional Woven Preforms", I Mech E 1986 pp. 133–139.
Yau et al, "Flexural and Axial Compressive Failures of Three–Dimensionally Braided Composite I–Beams", *Composite*, Jul. 1986 pp. 227–232.

(List continued on next page.)

*Primary Examiner*—James J. Bell
*Attorney, Agent, or Firm*—Hodgson, Russ, Andrews, Woods & Goodyear LLP

[57] ABSTRACT

A fiber preform having a web and at least one flange has fibers disposed in the web such that each follows a zig-zag path and is interlocked with the fibers of the flange. A manufacturing method for the preform includes interlocking the web yarns with those of the flange and engaging the web yarns at a plurality of points spaced longitudinally of the prefrom and also spaced from the flange in the direction of the web to define the required web dimension.

39 Claims, 15 Drawing Sheets

U.S. PATENT DOCUMENTS

| | | |
|---|---|---|
| 2,082,890 | 6/1937 | Holmes . |
| 2,138,155 | 11/1938 | Hall . |
| 2,247,760 | 7/1941 | MacDonald . |
| 2,297,708 | 10/1942 | Kaufman . |
| 2,318,082 | 5/1943 | Keen . |
| 2,346,551 | 4/1944 | Brindle . |
| 2,562,951 | 8/1951 | Rose . |
| 2,732,865 | 1/1956 | Neisler . |
| 2,778,761 | 1/1957 | Frieder . |
| 2,789,076 | 4/1957 | Frieder . |
| 2,848,018 | 8/1958 | Neigler . |
| 2,934,097 | 4/1960 | Hindle . |
| 3,008,213 | 11/1961 | Foster et al. . |
| 3,048,198 | 8/1962 | Koppleman et al. . |
| 3,132,671 | 5/1964 | Koppleman et al. . |
| 3,203,849 | 8/1965 | Katz et al. . |
| 3,216,460 | 11/1965 | Tomayko . |
| 3,217,752 | 11/1965 | Sutcliffe . |
| 3,237,650 | 3/1966 | Dickerson . |
| 3,502,171 | 3/1970 | Cowan . |
| 3,647,606 | 3/1972 | Notaro . |
| 3,769,142 | 10/1973 | Holmes et al. . |
| 3,799,209 | 3/1974 | Dow et al. . |
| 3,870,580 | 3/1975 | Belcher . |
| 4,020,202 | 4/1977 | Kreft . |
| 4,131,708 | 12/1978 | Moores et al. . |
| 4,193,828 | 3/1980 | Moores et al. . |
| 4,312,261 | 1/1982 | Florentine . |
| 4,379,798 | 4/1983 | Palmer et al. . |
| 4,394,203 | 7/1983 | Bompard et al. . |
| 5,021,281 | 6/1991 | Bompard et al. . |

OTHER PUBLICATIONS

Institute fur Textil–und Verfahrenstechnik Denkendorf, Textile Aspelete bei der Herstellung von Faserverbundwerkstoffen 1989.

Textile Technologies, Inc., "Advanced Composites & Engineering Publication" 1989.

Verpoest et al, 2.5 D and 3D Fabrics For Delamination Resistant Composite Laminates And Sandwich Structures, SAMPE 1989.

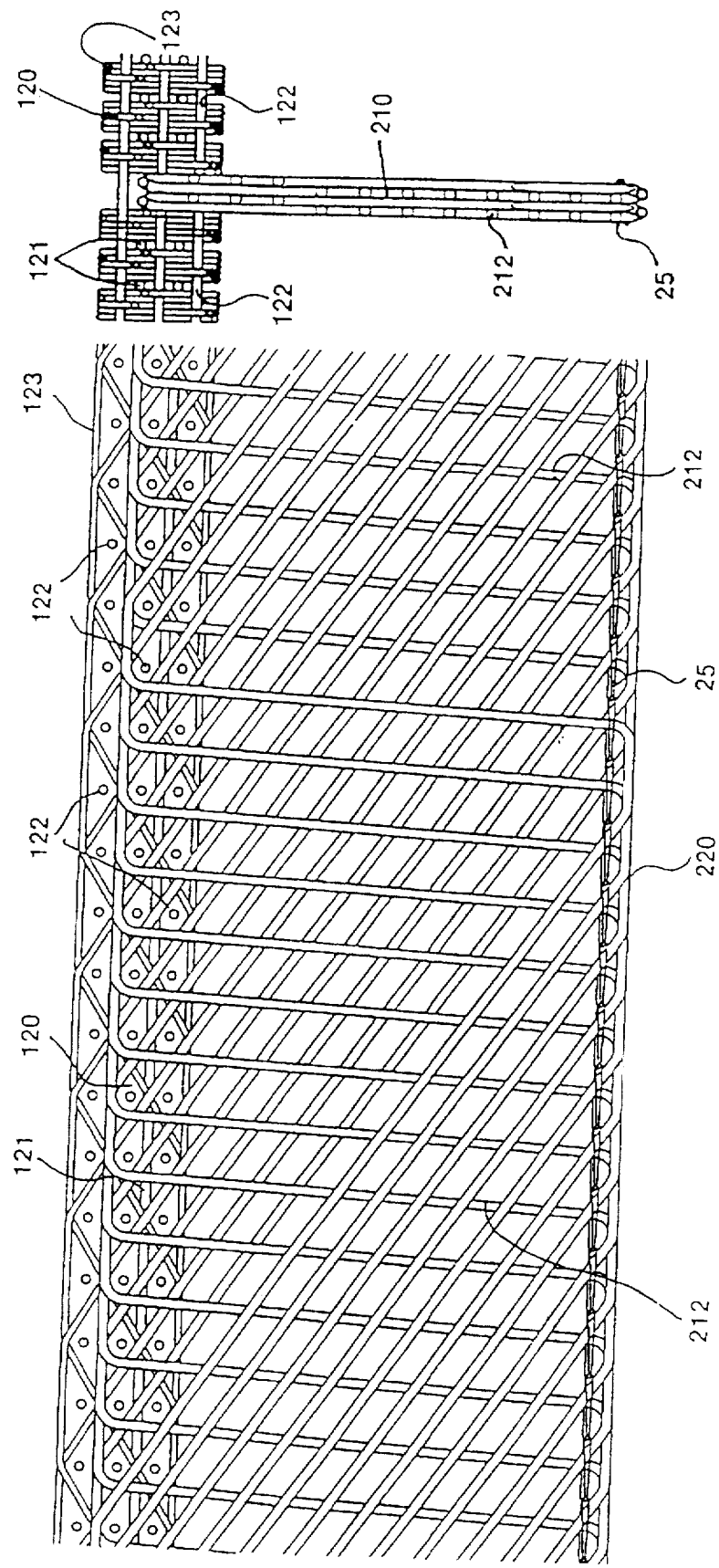

FIBRE PREFORMS FOR STRUCTURAL COMPOSITE COMPONENTS

This invention relates to fibre preforms for impregnation with a matrix material to form structural composite components, to structural composite components so formed, and to methods and apparatus for the manufacture of such p reforms.

Composite material consisting of high strength fibres (such as glass or carbon) in a matrix material (such as polyester or epoxy resin) are widely used in demanding applications such as aircraft structures, racing car chassis and tennis rackets. One well known method of producing composite components involves the assembly of fibres in the form of yarns into a preform which more or less resembles the shape of the final component. During the preforming process the yarns are placed in substantially the same position that they will occupy in the finished component. The final positioning of the fibres is achieved when, in a subsequent process, the matrix material is finally fixed in its intended position.

The term yarn is used herein to described a substantially continuous tow or thread (as opposed to a tape or sheet) containing a plurality of continuous or discontinuous fibres. The thread, tow or fibres may be pre-coated with a lubricant, a size, a corrosion inhibitor or the matrix material.

A particular common requirement for composite components is the ability to provide good flexural strength and/or good flexural stiffness. Such components are commonly (but not universally) termed beams and generally contain at least one flange attached and working in unison with at least one web. It is well known in the art that the function of the flange differs from that of the web. Flanges are usually placed remote from the neutral axis of bending, where the tensile and compressive stresses are highest, and are designed to provide substantial strength and/or stiffness in the longitudinal direction. The webs are usually employed to connect together flanges or to stiffen singly flanged components and are designed to perform best when subjected to shear loading in the plane of the web and/or substantially vertical loading in the plane of the web. It is also well known in the art that efficient beams require a substantial proportion of the fibres in the flanges to be aligned substantially along the longitudinal direction. It is also well known in the art that it is desirable to align the fibres in the webs to suit the loads encountered there and that the preferred fibre alignment is not in general longitudinal and/or vertical.

Various preforming techniques are known in the art as follows:

A fabric comprising two woven skins joined by drop yarns extending between the skins is produced commercially by (for example) Parabeam in Holland. The drop yarns in such a construction are not, in general, correctly orientated for good shear performance and such materials are known in the art to provide a very low shear stiffness. Furthermore, these materials do not provide continuous webs as is required for a smooth sided component. It is a fundamental limitation of this type of technique that the webs cannot be continuous and of good shear performance because it is not possible to introduce a sufficient number of yarns of sufficient size to create a substantially continuous web unless the web yarns a re at or close to the vertical direction.

Alternative forms of the double skin fabric are the fluted core fabric produced under the trade name Raypan Development Industries, USA during the 1960's and the trussed box type panel disclosed in U.S. Pat. No. 3,048,198. The fluted core fabric consists of two woven skins and a third intermediate layer which is attached alternately to one skin and then the other to form a fluted cellular structure. Both this and the trussed box type panel suffer from the limitation that they do not allow the construction of a simple beam with optimum fibre alignment in the web.

U.S. Pat. No. 4,379,798 describes a further preforming technique for structural beams. This technique involves fabrics which are woven with a split portion which can be opened out to form (for example) an I beam. This technique results in the fibre orientations in the web being longitudinal and transverse (as defined below) which is not, in general, optimum. In the case of curved and tapered components the fibre orientations in the flange are also non-optimum.

European patent no. 0 329 434 (Mitsubishi) discloses a fibre-beam preform in which the fibre alignment in the web can be optimized. However, the aligned fibres are arranged in layers with each layer having only one alignment direction. This prevents the preform being manufactured economically.

A further technique known in the art for producing preforms for beam components comprises the assembly of separate fabrics to form the desired shape. The separate components are fixed to each other before impregnation by stitching or with an adhesive. Although this process can produce the desired fibre orientations it involves a large amount of manual processing which renders it expensive and susceptible to poor consistency.

An additional technique known in the art is that of three dimensional braiding as described in U.S. Pat. No. 4,312,261. Three dimensionally braided components may take the general form of a beam with flanges and a web although curved or tapered components are not known in the art. A further limitation of three dimensional braiding is that a relatively large amount of crimp is introduced into the fibre. A yet further limitation of three dimensional braiding is its relatively slow speed of production.

It is an object of this invention to provide an improved fibre preform and a method for producing the preform on a modified weaving loom. A further object is to provide a method for producing curved components on a weaving loom.

This invention consists in one aspect in a fibre preform comprising at least a first flange and at least one web woven in one piece with the flange or flanges, in which the or each web contains a plurality of yarns each of which extends repeatedly from the first flange to a free edge of the web or to another flange, each yarn extending between yarns of the first flange so as to be interlocked therewith, the preform being woven such that at least some of the web yarns repeatedly extend alternately from the flange at a first angle to the plane of the flange and return to the flange at a second angle to the plane of the flange, the web yarns forming transversely concentrated substantially continuous wall of fibre.

In another aspect the invention provides a fibre preform comprising at least on flange and at least one web woven in one piece with the flange or flanges, in which the or each web contains a plurality of yarns each of which extends repeatedly from a flange to a free edge of the web or to another flange, each yarn extending through one surface of the flange and between yarns of the flange so as to be interlocked therewith but without extending to the opposite surface of the flange, the preform being woven such that at least some of the web yarns repeatedly extend alternately from the flange at a first angle to the plane of the flange and return to the flange at a second angle to the plane of the flange.

The invention also provides a fibre preform comprising at least one flange including interwoven longitudinally extending and transversely extending structural yarns and at least one web woven in one piece with the flange or flanges, in which the or each web contains a plurality of structural yarns each of which extends repeatedly from a flange to a free edge of the web or to another flange, each yarn extending between yarns of the flange so as to be interlocked therewith, the preform being woven such that at least some of the web yarns repeatedly extend alternatively from the flange at a first angle to the plane of the flange and return to the flange at a second angle to the plane of the flange, the interweaving of the flange yarns being non-constant as between one location and another in the flange.

The first and second angles may be equal but of opposite sense.

Preferably, the or each flange comprises a plurality of yarns extending in the longitudinal direction interwoven with a plurality of transversely extending yarns. The longitudinally extending yarns, and the yarns forming the web, may be warp yarns, the transversely extending yarns being weft yarns. Alternatively, the longitudinally extending yarns of the or each flange and the web yarns may be weft yarns, the transversely extending yarns of the or each flange being warp yarns.

The yarns forming the or each web may be closely spaced, so that the web forms a transversely concentrated, substantially continuous wall of fibre. Thus, in a structural composite component embodying a preform as set forth above (which component constitutes an aspect of the invention) the ratio of the volume of fibre in the or each web to the total volume of the web may exceed 0.1 when measured after the matrix material has been fixed. In the preferred embodiment, the ratio exceeds 0.25 and preferably exceeds 0.4.

It further is preferred that the distance between any two adjacent flanges when measured in the plane of a web linking said flanges or in the case of a singly flanged preform, the distance between a flange and the extreme edge of a web, measured in the plane of said web, exceeds 5 millimetres at any part of the web.

The preform may contain glass fibre.

The preform of this invention has the advantage that it enables the orientation of yarns in the or each web to be selected to provide optimum orientation for particular applications. The fibre orientations in the or each web can be selected independently of those in the flange or flanges.

The interlocking of the yarns in the web with those in the flange provides strength in the structural connection between the web and flange. The structure of the preform enables the web yarns to be as straight as possible, which is desirable from a structural point of view. The web can be made substantially smooth and continuous to provide a component of simple form and to allow impregnation of the preform in simple mould tools. The invention enables tapered and/or curved preforms to be made, with fibre orientations appropriate to the shape of the preform.

In a further aspect the invention provides a method of making a preform as set forth above, the method comprising weaving the first flange and establishing the web yarns by interlocking them with the flange yarns and engaging the web yarns at a plurality of points spaced longitudinally of the preform during weaving thereof said points being spaced from the flange yarns in the direction of the web to define the required web dimension.

The web yarns may be engaged at longitudinally spaced points close to the flange yarns, said points being progressively moved away from the flange yarns to draw out the web yarns.

The method thus may comprise engaging said web yarns at a controlled distance from the flange yarns during weaving and maintaining said engagement during sufficient longitudinal movement of the woven preform so that the web yarns are locked and upon disengagement of the web yarns are not drawn back into the preform.

The method may also comprise engaging the web yarns by interlocking them with a further flange adjacent the first flange during weaving thereof and then progressively separating the first and further flanges.

In another embodiment the method may comprise transferring the yarns between shedding positions for first flange and further positions corresponding to the said points spaced from the flange yarns.

At least some of the yarns may be held in shedding positions intermediate the shedding positions for the first flange and the further positions.

Thus in another aspect the invention provides a method of manufacturing a fibre preform comprising at least one flange and at least one web woven in one piece with the flange or flanges, in which the or each web contains a plurality of yarns each of which extends repeatedly from a said flange to a free edge of the web or to another flange, each said yarn extending between yarns of the flange so as to be interlocked therewith, the preform being woven such that at least some of the web yarns repeatedly extend alternately from the flange at a first angle to the plane of the flange and return to the flange at a second angle to the plane of the flange, the method comprising weaving a flange and establishing the web yarns by interlocking them with the flange yarns, engaging the web yarns at a plurality of points spaced longitudinally of the preform during weaving thereof, the points being spaced from the flange yarns in the direction of the web to define the required web dimension, transferring the web yarns alternately between shedding positions for the flange and further shedding positions corresponding to the points spaced from the flange yarns, and holding some of the yarns in shedding positions corresponding to the points spaced from the flange yarns, and holding some of the yarns in shedding positions intermediate the flange shedding position and the further shedding positions.

The intermediate shedding positions may be spaced at equal intervals.

The points may be spaced from the flange yarns by a constant distance substantially equal to the required web dimension.

The method may comprise weaving the first flange and a further flange at a distance apart defining the required web dimensions, disposing web yarns between the flanges and engaging the web yarns by interlocking them with the further flange.

The preform may be post-formed to a curved shape after wearing thereof.

The invention also provides in another aspect apparatus for manufacturing a fibre preform comprising at least a first flange and at least one web woven in one piece with the flange or flanges, in which the or each web contains a plurality of yarns each of which extends repeatedly from the first flange to a free edge of the web or to another flange, each yarn extending between yarns of the first flange so as to be interlocked therewith, the preform being woven such that at least some of the web yarns repeatedly extend alternately from the flange at a first angle to the plane of the flange and return to the flange at a second angle to the plane of the flange, means for weaving the first flange, means for interlocking web yarns at a plurality of points spaced longitudinally of the preform during weaving thereof, the points being spaced from the flange yarns in the direction of the web to define the required web dimension.

The engagement means may comprise means for moving the points of engagement of the web yarns from initial positions close to the flange yarns progressively away from the flange yarns to draw-out the web yarns.

The engagement means may be adapted to engage said yarns at a controlled distance from the web yarns and to maintain said engagement during longitudinal movement of the preform until the woven web yarns are no longer under tension from yet to be woven web yarn.

There may be means for weaving a further flange adjacent the first flange, the engagement means being adapted to interlock the web yarns with the further flange, and means for progressively separating the first and further flanges.

There may be holding means for holding at least some of the web yarns in one or more shedding positions intermediate the shedding positions for the first flange and further positions.

The engagement means may be adapted to engage the web yarns at a distance substantially equal to the required web dimension.

There may be means for weaving a further flange at a controlled distance from the first flange to define the web dimension, and means for disposing the web yarns between the flanges, the engagement means being adapted to interlock the web yarns with the yarn of the further flange.

The means for disposing the web yarns may comprise means for transferring the web yarns between shedding positions in the first flange and shedding positions in the further flange.

There may be means for deflecting a web yarn at a point intermediate a heald through which the yarn passes and the preform to permit passage of a weft yarn.

Thus, there may be means for deflecting the web yarn away from the preform in a direction longitudinally thereof to permit passage of a weft yarn and for thereafter deflecting the web yarn towards the preform, and means for retaining the web yarn after deflection towards the preform.

The deflecting means may be a retractable member extensible transversely in front of the preform and moveable back and forth longitudinally thereof.

Figure 1B:
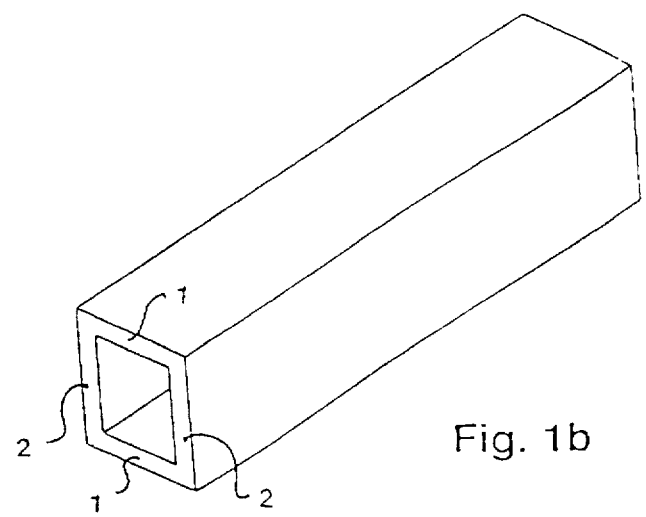
Figure 1C:
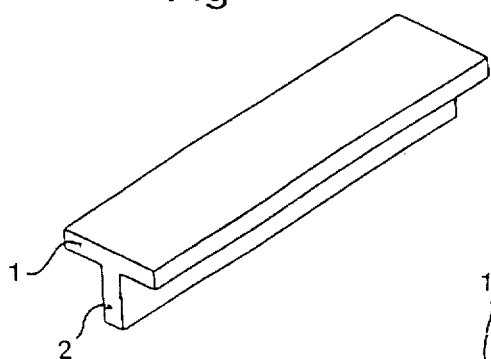
Figure 1D:
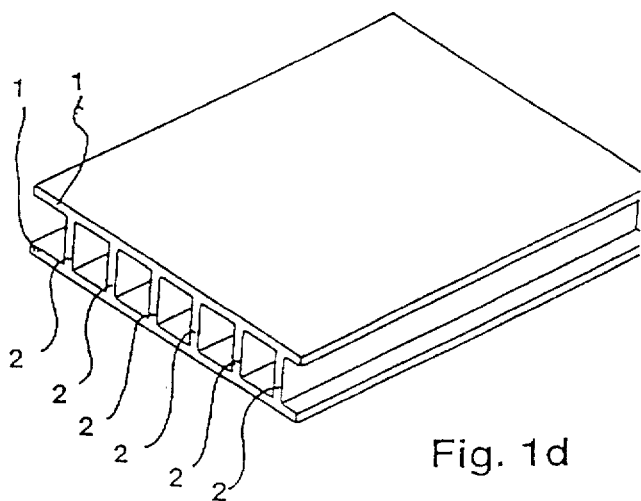
Figure 1E:
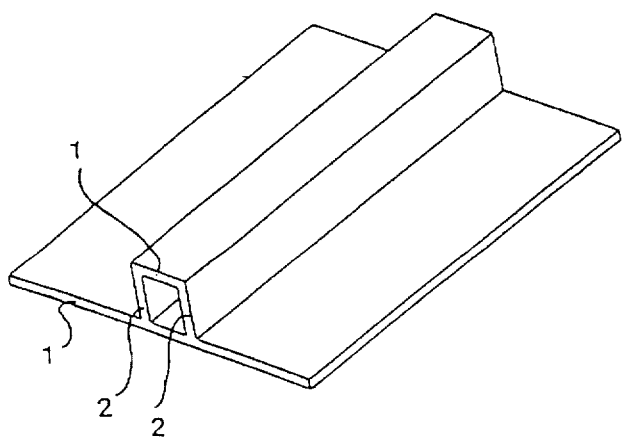
Figure 2:
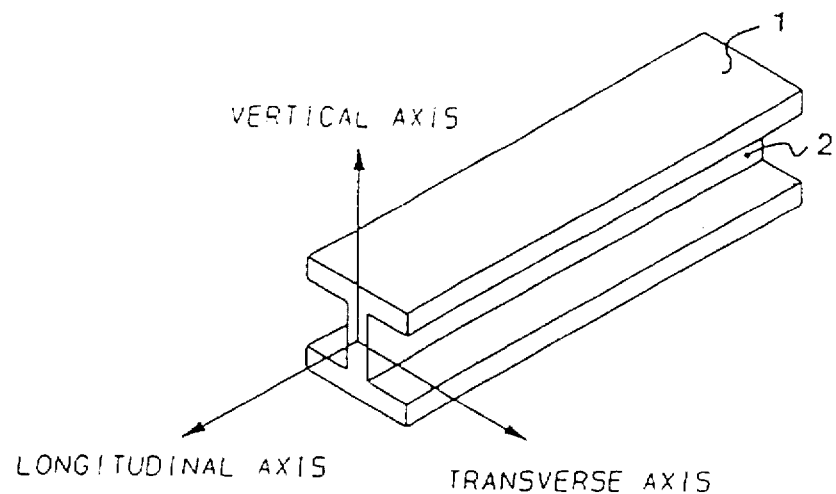

The invention will now be described, by way of example, with reference to the accompanying drawings in which:

FIGS. 1a to 1e illustrate some typical forms of beam which can be made using the preform of this invention, FIG. 2 shows the way in which the terms longitudinal axis, transverse axis and vertical axis are used in the specification.

Figure 3:
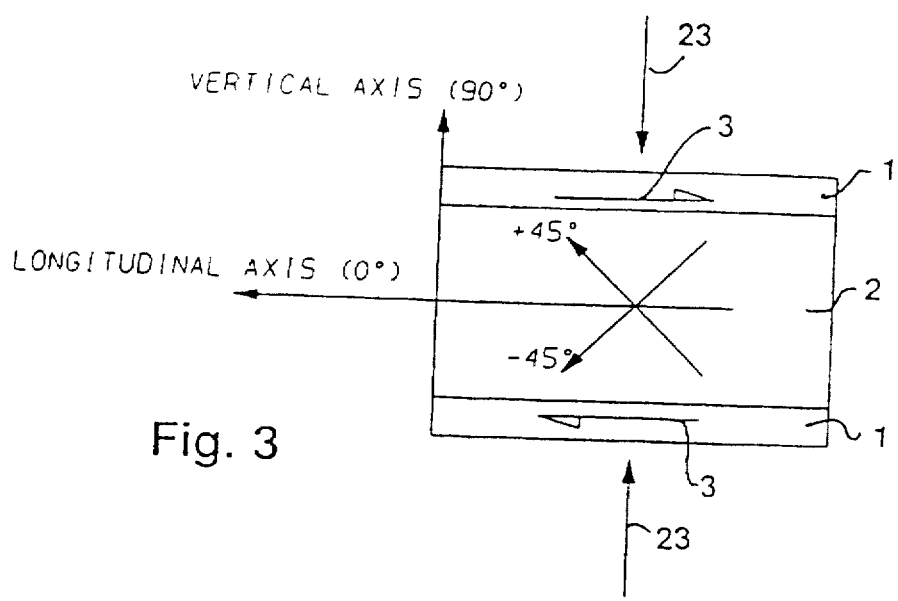
Figures 4, 5:
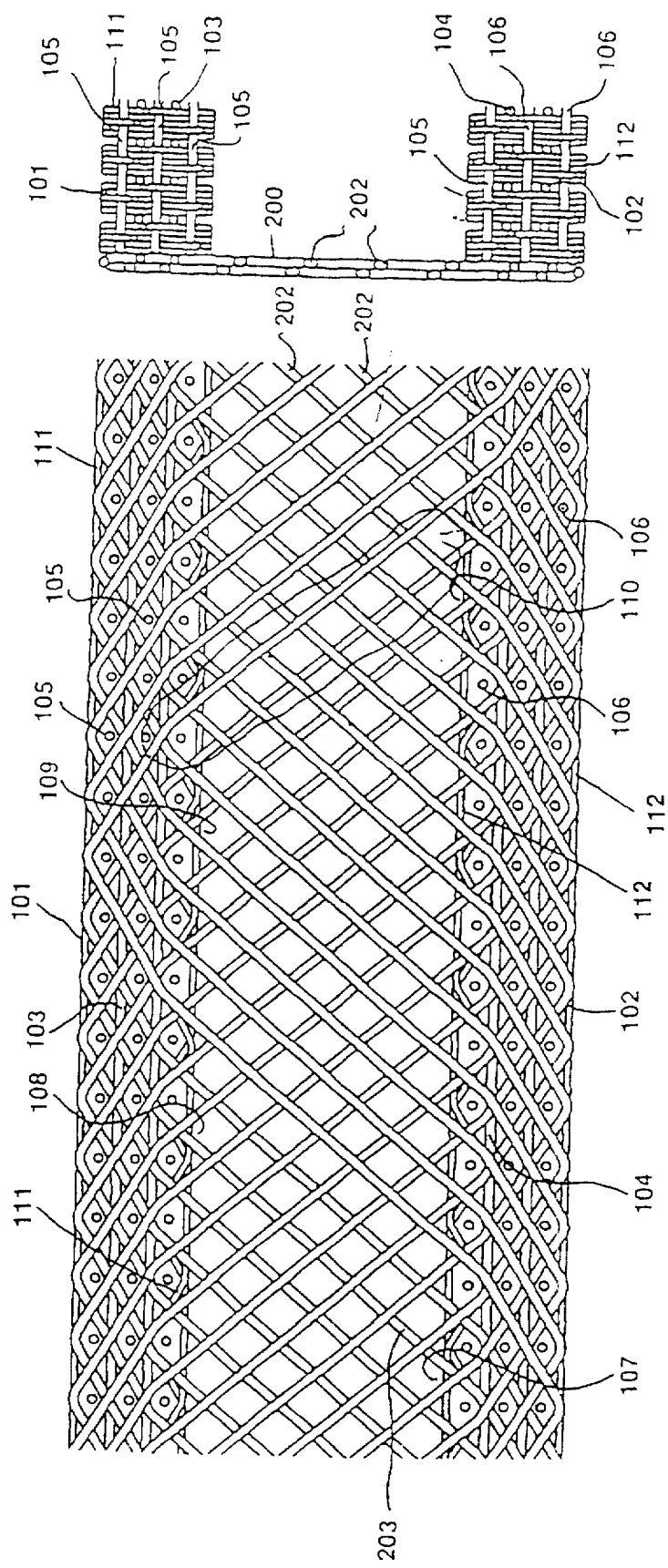
Figure 8A:
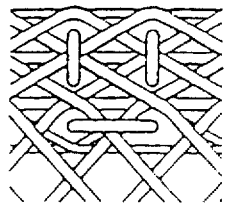
Figure 8B:
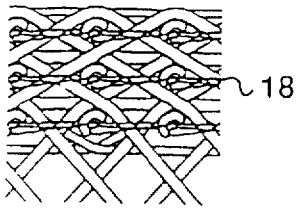
Figure 8C:
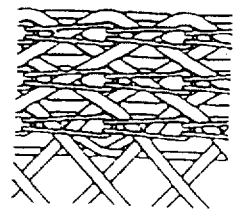
Figure 9:
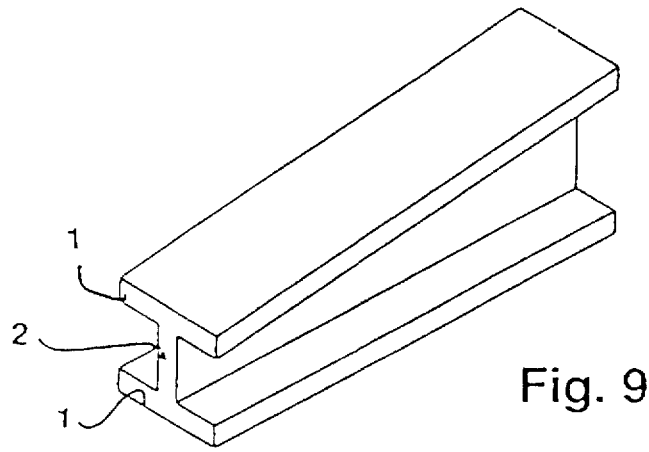
Figure 10:
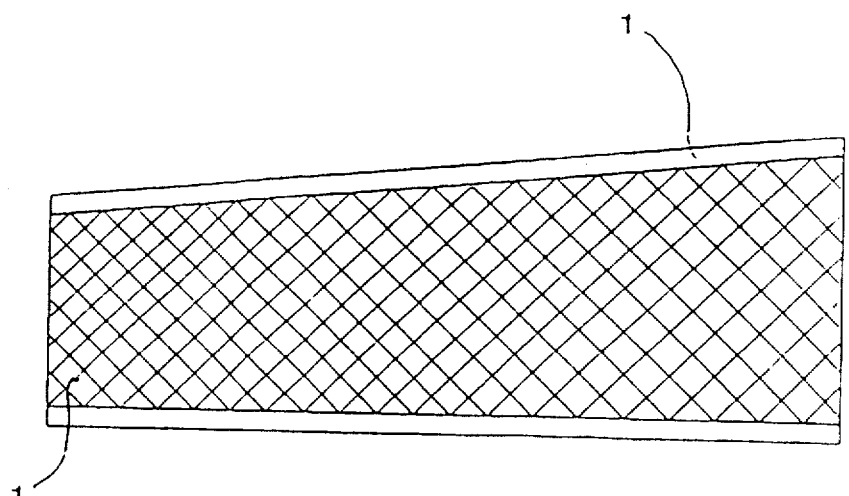
Figure 11:
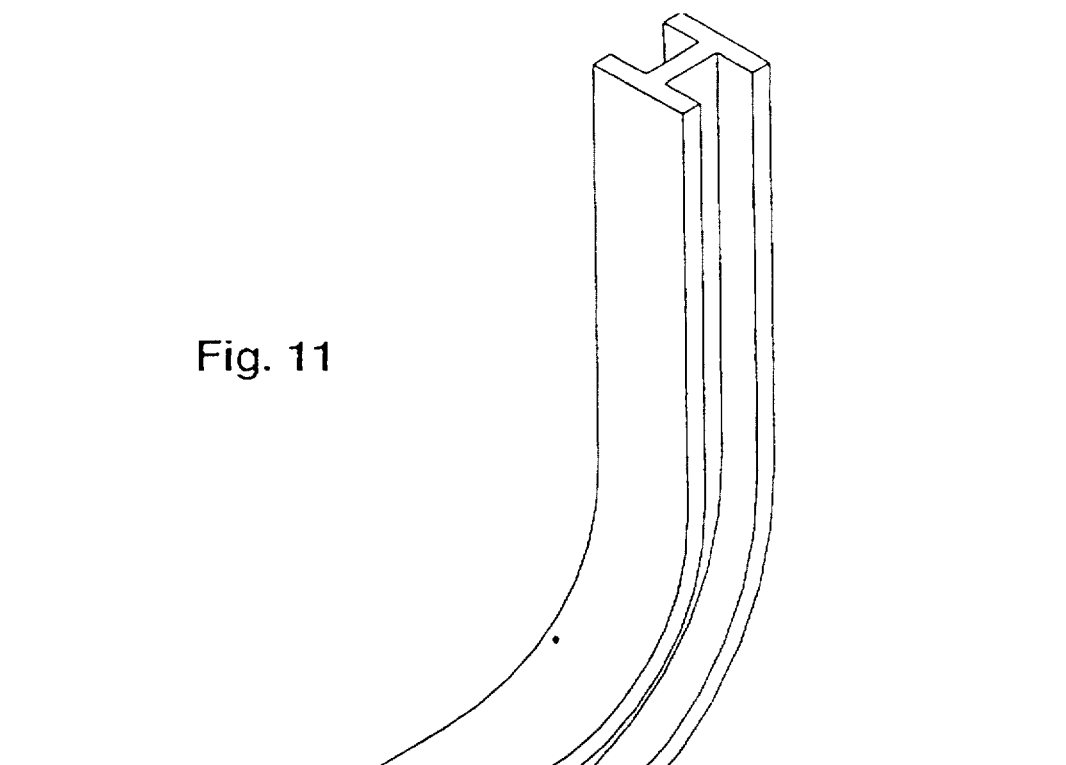
Figure 12:
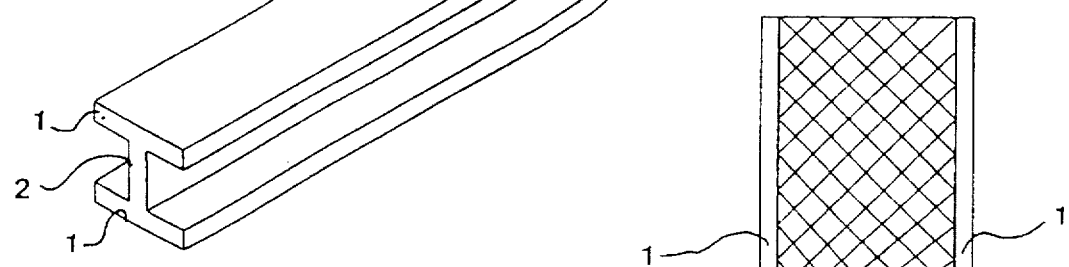

FIG. 3 is a partial side view of a preform to illustrate typical web loadings and fibre orientations, FIG. 4 is a fragmentary side view of a preform in accordance with the invention having a web and two flanges, FIG. 5 is a fragmentary end view of a T-section preform of FIG. 4, FIG. 6 is a fragmentary side view of a T-section preform in accordance with the invention, FIG. 7 is a fragmentary end view of the preform of FIG. 6, FIGS. 8a and 8c show forms of weft yarn selvedging which can be used in forming the preform of the invention, FIG. 9 shows a tapered component which can be made using the preform of this invention. The individual yarns in the flanges have been omitted to aid clarity, FIG. 10 is a side view of a preform illustrating the paths of web yarns in the component of FIG. 9, FIG. 11 shows a curved beam which can be made using the preform of this invention, FIG. 12 is a side view of a preform showing the paths of web yarns in the component of FIG. 11. The individual yarns in the flanges have been omitted to aid clarity.

Figure 13:
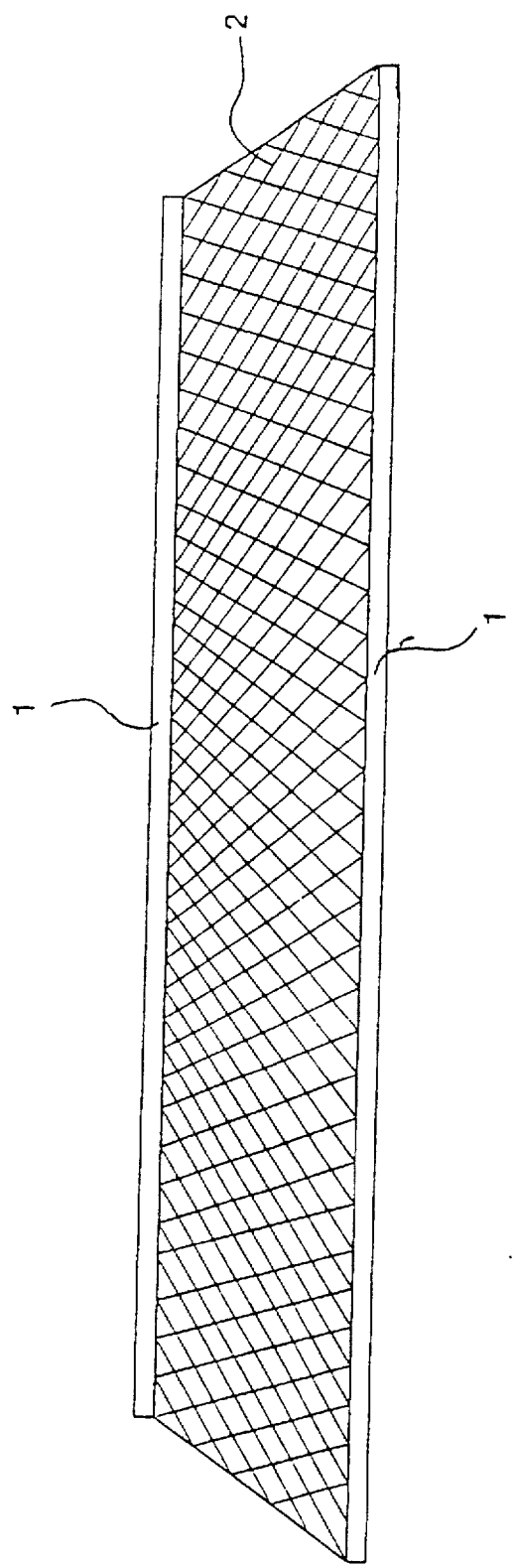
Figure 14:
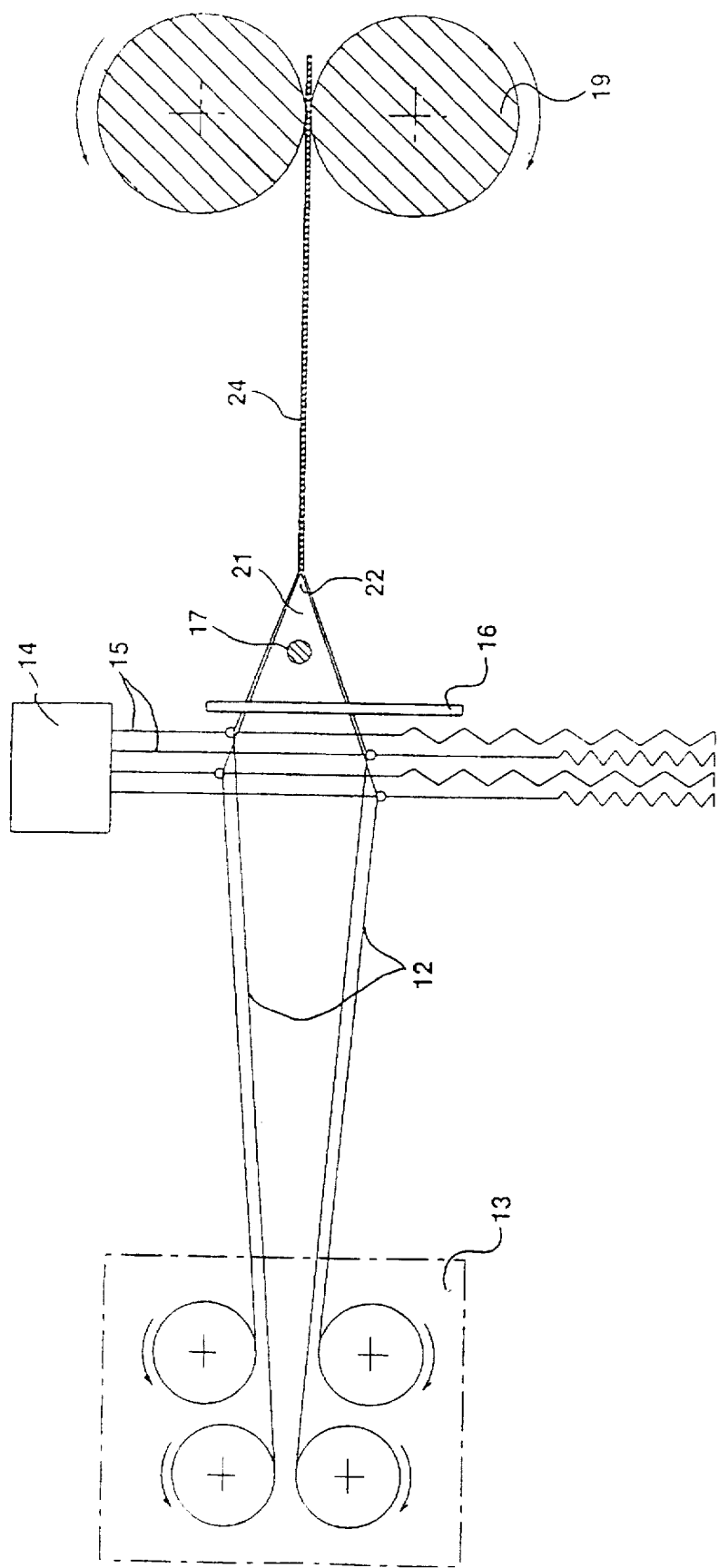
Figure 15:
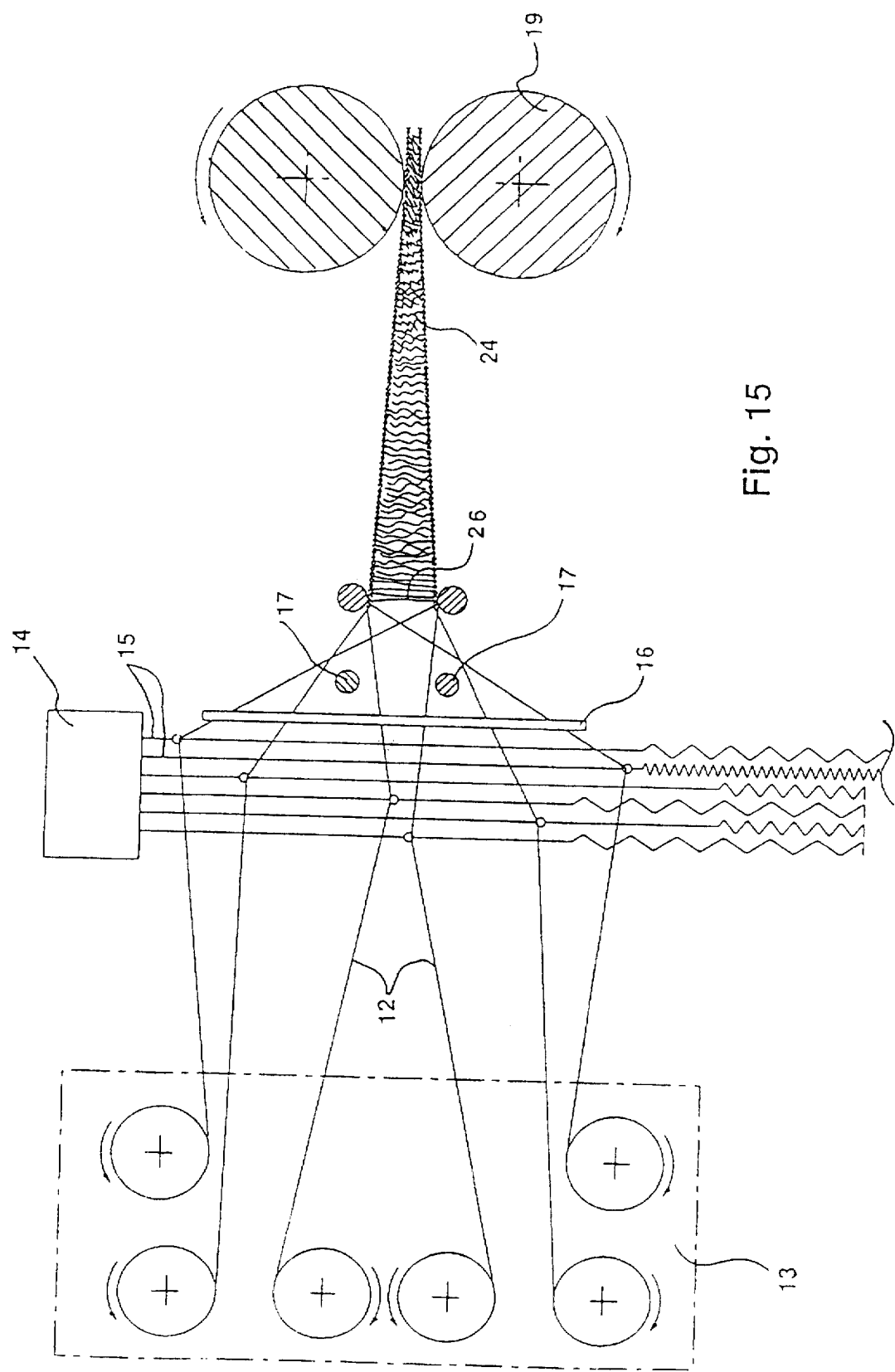
Figure 16A:
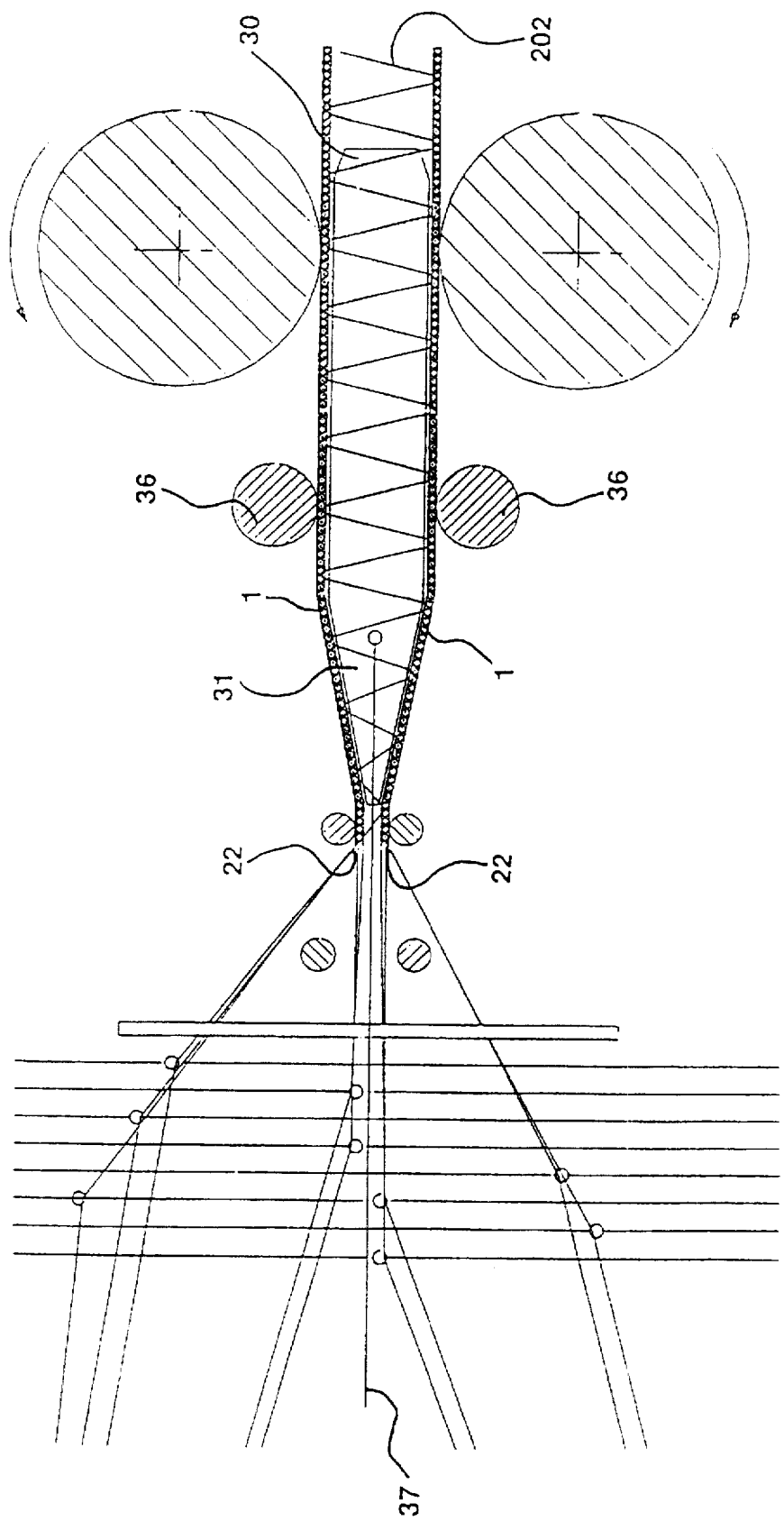
Figure 16B:
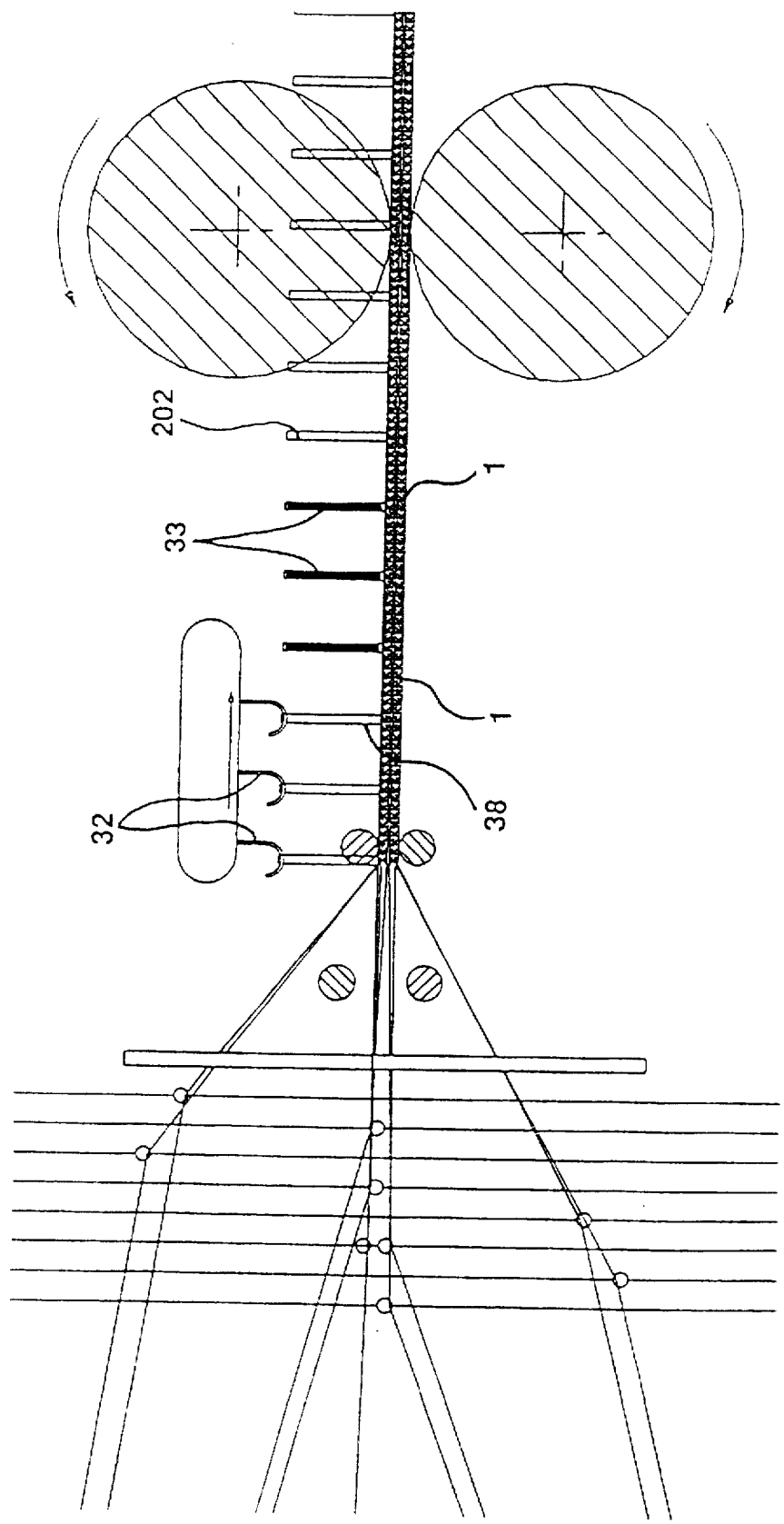
Figure 16C:
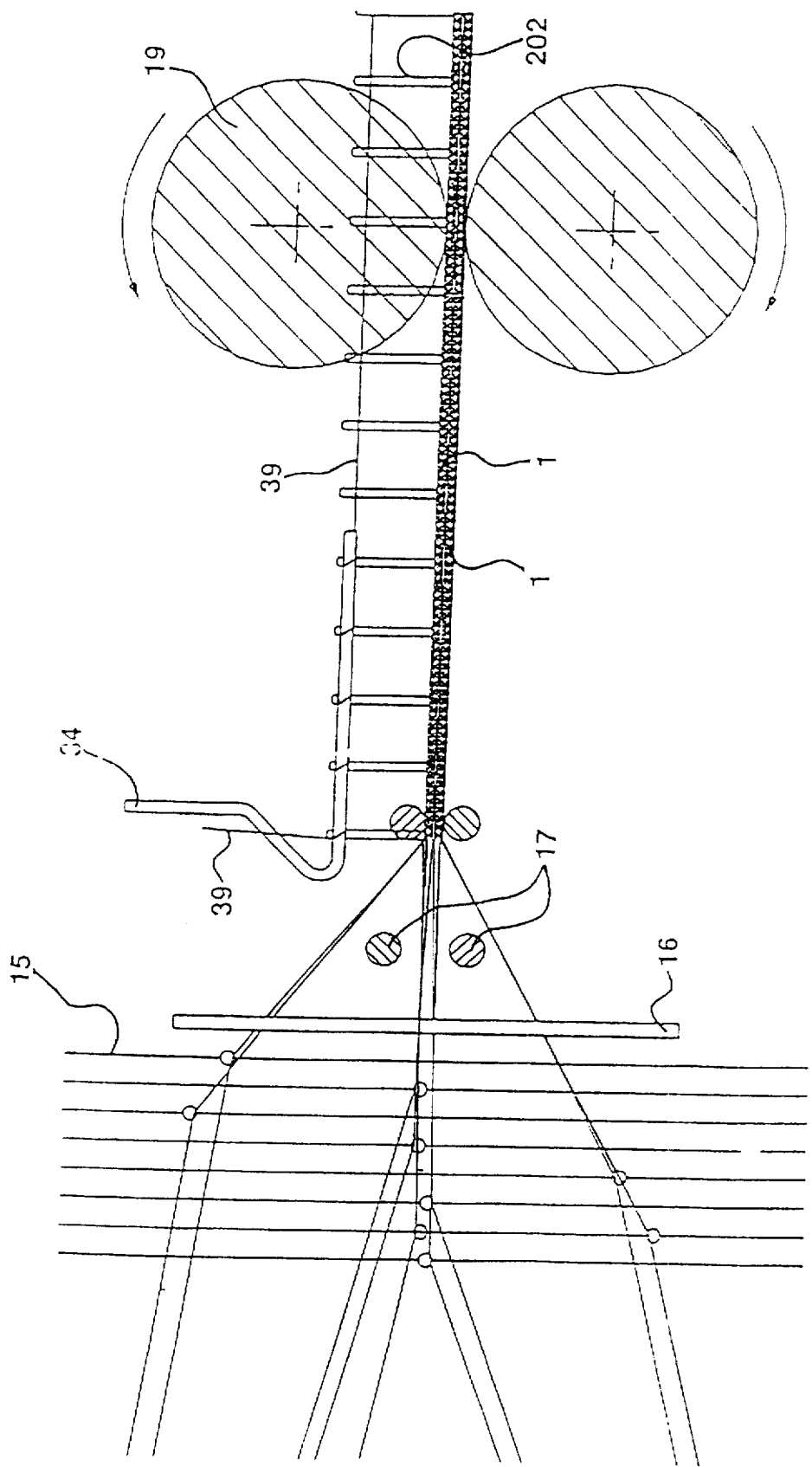
Figure 17:
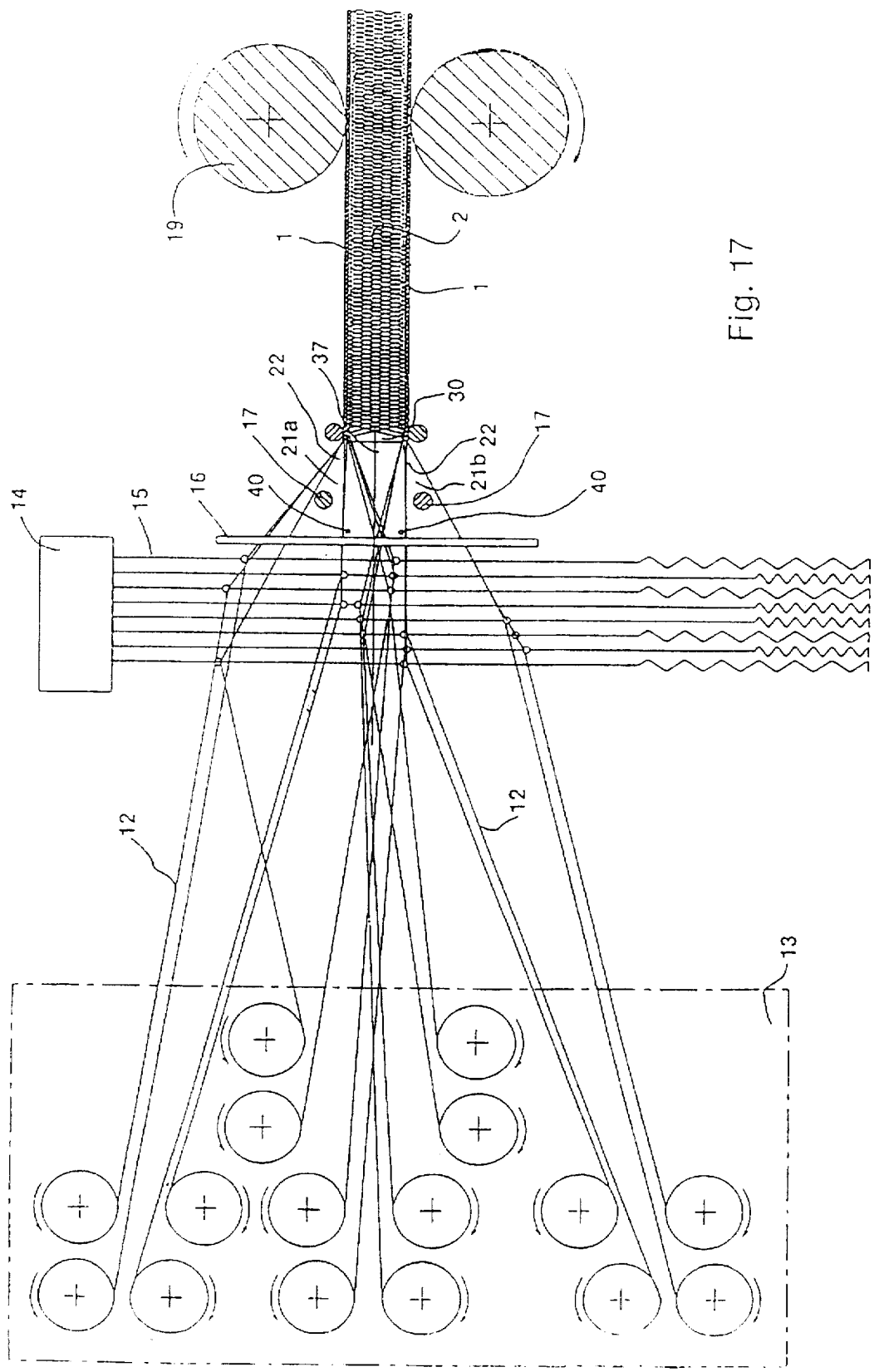
Figures 19A, 19B:
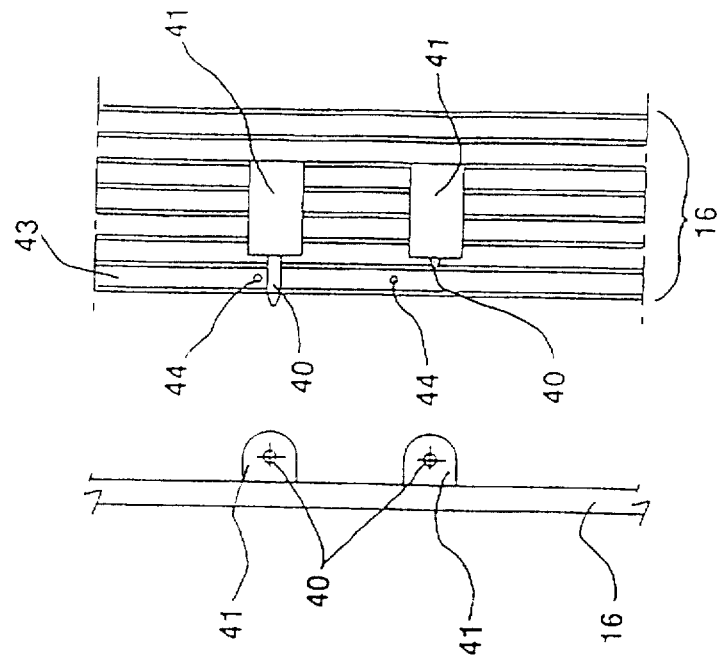
Figure 18:
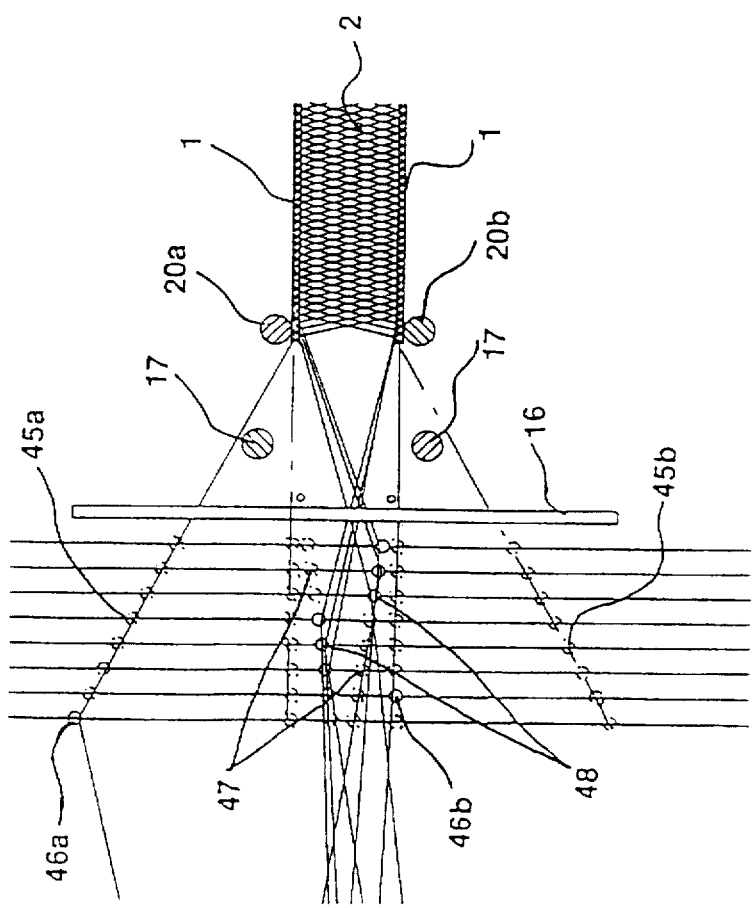

FIG. 13 is a side view of the preform of FIG. 12 before it is bent into the curved shape (again with the flange yarns omitted), FIG. 14 is a diagrammatic side view of a conventional single skin fabric loom, FIG. 15 is a diagrammatic side view of a conventional double skin fabric loom, FIGS. 16a to 16c are diagrammatic side views of weaving looms used to produce preforms in accordance with the invention, a single web yarn only being shown, the others being omitted for clarity, FIG. 17 is a diagrammatic side view of another embodiment of a loom for producing preforms of the present invention, FIG. 18 is a diagrammatic side view showing vertically distributed web yarn heald positions, FIG. 19a and 19b respectively are diagrammatic side and end views of a shed to shed transfer mechanism.

FIG. 20a to 20d illustrates the operation of the shed to shed transfer mechanism of FIG. 19.

FIGS. 1a to 1e show various beams which can be made using the preform of this invention. FIG. 1a shows and I beam, having two flanges 1 joined by a web 2. FIG. 1b shows a box section with two flanges 1 joined by two webs 2. FIG. 1c shows a T section with a single flange 1 and a single web 2. FIG. 1d shows a sandwich panel, with two flanges 1 joined by a number of spaced webs 2. FIG. 1e shows a panel, formed by a flange 1 stiffened with a top hat section stringer formed by a second flange 1' joined to the first flange by two webs 2.

In each case, as described above, the flange or flanges provide substantial strength and/or stiffness in the longitudinal direction (as shown in FIG. 2) and the webs connect together flanges or, as in the beam of FIG. 1c, stiffen a single flanged component. The webs are designed to perform best when subject to shear loading (as shown by arrows 3 in FIG. 3) in the plane of the web and/or substantially vertical loading (arrows 23 in FIG. 3) in the plane of the web. As mentioned above, it is desirable to align the fibres in the webs to suit the loads encountered. One common example is the case where the in-plane shear loads (3 in FIG. 3) dominate the loading of the web. In this case one preferred fibre orientation would be ±45° to the longitudinal axis, as shown in FIG. 3.

FIGS. 4 and 5 show diagrammatically the structure of a preform made in accordance with the invention having two parallel flanges 101 and 102 and a web 200 extending between the flanges. Each flange consists of a woven fabric containing a plurality of longitudinal yarns 103, 104 and a plurality of transverse yarns 105, 106, woven together in any suitable weaved pattern. Additional yarns 111, 112 are woven into the flanges in a zig zag path travelling from one surface of the flange to the other end back in a cyclical manner. The woven structure of the flanges need not be constant throughout the length or width of the component.

The web 200 consists of a plurality of yarns 202. As shown in FIG. 4, a typical yarn 203 emerges from lower flange 102 at a point 107, and extends to a point 108 in the upper flange 101, the point 108 being longitudinally spaced from the point 107, so that the yarn 203 extends at a desired angle to the longitudinal axis of the component. The yarn 203 enters the upper flange 101, extends between the longitudinal yarns 103, zig zag yarns 111 and transverse yarns 105 of the flange 101 and emerges from the lower face of flange 101 at a point 109 spaced longitudinally from point 108 so that the yarn 203 is interlocked with some of the yarns 103 and 105 of the flange 101. The yarn 203 then extends again to the lower flange 102 and enters it at a point 110 spaced longitudinally from point 109 so that the yarn extends at a desired angle to the longitudinal axis of the beam. The yarn 203 extends between the longitudinal yarns 104, zig-zag yarns 112 and transverse yarns 106 of the lower flange 102 and emerges from the upper face of the lower flange at a point spaced longitudinal from point 109, so that the yarn is interlocked with the yarns of the lower flange. The yarn 203 then extends again to the upper flange 101, the pattern being repeated for the length of the component.

The number and arrangement of yarns 202 forming the web is such that the yarns form a substantially continuous and transversely concentrated wall of fibre, of desired transverse thickness.

FIGS. 6 and 7 show a T-section preform having a single flange 120 and a single web 210. The flange is formed by interwoven longitudinal yarns 121, transverse yarns 122 and zig-zag yarns 123. The web is formed by a plurality of yarns 212, each of which extends repeatedly from the flange 120 to the free edge 220 of the web, each web yarn being interlocked with yarns of the flange, in a similar manner to the web yarns of the beam shown in FIGS. 4 and 5. A binder yarn 25 may be employed to link together web yarns not located by a flange.

FIGS. 4 and 6 show typical web yarn paths, but it will be understood that the paths of the web yarns can take many alternative forms to suit the particular needs of the component. It will also be understood that the paths followed by the yarns in a web may change to a different form in regions within the component where different fibre orientations are preferred. It will be further understood that all or some of the yarns in a web may form part of a flange or flanges in a section of the component, and that some or all of the web yarns may depart completely from the component in one or more sections. In the case of components with a plurality of webs, the webs need not necessarily be identical.

In the case of component which are tapered such that the distance between the flanges varies when measured at varying places along the web, for example as shown in FIG. 9, the entry and exit points of the web yarns from the flanges may be chosen to maintain the preferred yarn orientation in the webs, as shown in FIG. 10. Similarly it will also be understood that in the case of curved components, such as that shown in FIG. 11 the entry and exit points may be chosen to maintain the preferred yarn orientation in the webs with respect to the local geometry of the component as shown in FIG. 12.

To produce a curved component such as that shown in FIG. 11, the web yarn layout is chosen according to, for example, the structural requirements and a typical example is shown in FIG. 12. Notice that the ±45° web yarn orientation is maintained relative to the local tangent direction. This component is not woven directly in the curved form but it is instead woven as a straight piece and then post curved. FIG. 13 shows the component of FIG. 12 in the as woven, straight state which is similar to a straight component of this invention although the points at which the web yarns enter and exit the flanges differ form those that would usually be chosen for a straight component; they are closer together in the shorter flange which will form the inside flange of the curved form. To achieve the curved components of FIG. 12 from the straight component of FIG. 13, the preform is manipulated into the curved shape and the web yarns pulled taught while the flanges are held in the preferred position. In order for the web yarns to adopt the new position they must slide a short distance through the flanges. The variable spacing between the web yarn entry and exit points can best be achieved by adjusting the pitch of the transverse flange yarns (105, 106 of FIG. 4). It is also possible to achieve a similar effect by maintaining a constant spacing of the transverse yarns and placing the web yarn into the flange adjacent to the nearest transverse yarn and using some locations more than once and/or not using some locations at all.

In the case of a web positioned within the width of a component, for example as shown in FIGS. 6 and 7, the longitudinal zig-zag yarns in the flange or flanges provide transverse location for said web. When positioned at the edge of a flange or flanges, for example as shown in FIGS. 4 and 5, a web may be secured in the transverse direction by known selvedging techniques, such as returning the weft yarn through a different shed to the shed in which it previously traversed the preform as shown in FIGS. 8a, knitting a binder yarn 18 between the loops formed at the extremity of a rapier inserted weft yarn as shown in FIG. 8b or knitting the loops of rapier inserted weft yarns to one another as shown in FIG. 8c, or any combination of these techniques.

Conventional weaving looms can produce flat fabrics such as a single skin 1 and double skinned fabrics with drop yarns between them but cannot produce the substantial continuous webs of the present invention or the unsupported webs of singly flanged preforms. We shall therefore describe conventional looms in brief detail sufficient to enable one skilled in the art to recognize the technique. Those additional features necessary for the execution of the present invention will then be described in greater detail.

FIG. 14 shows a conventional loom. Conventional looms generally comprise the following key components: means for supplying warp yarn such as a beam or creel 13, means for hauling off completed fabric 19, means such as a jacquard 14 and healds 15 for forming a shed 21 with the warp yarns 12, means such a rapier 17 for inserting weft yarns 24, means for beating weft yarns into the fell 22 such as sley motion and reed 16, and means for forming selvedge of the weft yarns (not shown).

These components cooperate to produce a woven fabric in the following cyclic manner. A shed is opened by lifting a selection of healds chosen according to the weave pattern required. Through this shed is inserted a weft yarn using a rapier mechanism. The rapier is withdrawn and the weft yarn compressed into the fell by the reed which moves from a position next to the healds to the fell and back in an oscillating motion. During the period when the reed moves forward and back, a new shed will be formed by lifting a new set of healds, such that on completion of the reed cycle, a new weft yarn may be inserted. For each cycle of the machine, the haul off mechanism takes up the newly woven fabric and a corresponding amount of warp yarn is drawn from the creel. The healds are arranged in sets forming rows running in the direction of the warp yarns. Many sets are arranged side by side running across the loom but only the nearest set can be seen in FIG. 14.

FIG. 15 shows an alternative implementation of a conventional loom in which two fabrics are woven together and drop yarns 26 are inserted between the fabrics. This loom also contains the same elements as the single fabric loom of FIG. 14 but some units such as the rapier are duplicated. These double skin fabrics are limited to fabrics or preforms which contain only a very low density of web yarns.

All or any of the following additional means are employed in the production of preforms according to the various preformed forms of the method and apparatus of the present invention; means for weaving preforms with an extended distance between the skins or flanges, means for accommodating the large amount of yarn required for the web in the shed, means for transferring yarns from one skin to another, means for supporting singly flanged webs, and means for controlling the distance between skins.

Several methods may be employed for producing preforms with an extended distance between flanges or skins. In the case of preforms with a modest amount of yarn in the webs and a limited web height, it is possible to weave both skins in close proximity to one another so that the web yarns are interlocked by the yarns of the upper flange or skin, and are engaged or interlocked with the yarns of lower flange at longitudinally spaced points. Then the distance between the skins is expanded using a low friction former (or formers) 30 as shown in FIG. 16a. The leading tapered section 31 of the former must be close to the fells 22 so that the web yarns are only required to slide through a small number of web/skin intersections. The former must also be long enough to ensure that the web yarns become locked and the tension of the yet-to-be-woven web yarns does not draw the skins back together after the preform leaves the former. The former 30 may be located by wheels 36 external to the preform and/or cables 37 running through the reed to a suitably rigid mounting position.

As alternative method for preforms with modest amounts of yarn in the web and also modest length is to weave the preform with the skins close together and then expand the distance between the skins in a post forming operation. In this case, the web yarns are drawn in from the ends of the preform.

A yet further method for preforms with modest webs involves weaving the flanges or skins in close proximity and raising loops above a skin which are engaged and supported at longitudinally spaced intervals either by hooks 32 or by blades 33 as shown in FIG. 16b. In this case of hooks, a mechanism is employed to position the web yarns onto the hooks and also means for moving the hooks with the preform to support the loops until they have travelled far enough from the fell to prevent the tension in the web yarns drawing the loops back through the preform. In the case of blades, a blade 33 is inserted through the shed at an appropriate time corresponding to the formation of the loop 38 and left in whilst weaving continues, each loop being held by a blade until it has travelled far enough to prevent the loop being drawn back into the preform whereupon the blades may be removed in a transverse direction. An alternative to blades and hooks is the selvedge formed around a stationary rod 34 (FIG. 16c). The stitches are formed in a binder yarn 39 such as polyester in a manner similar to the yarn 25 in FIG. 6. The rod 34 is long enough to prevent the loops being drawn back into the preform but short enough to allow the web to disengage before reaching the haul off mechanism. The flanges or skins in FIGS. 16b and 16c are drawn apart downstream of the haul-off mechanism 19 by a former or other convenient means (not shown).

These aforementioned hooks, blades and selvedge stitches on a rod may also be employed in the production of free standing webs such as 210 in FIG. 6.

In the case of preforms with more substantial webs, it is preferable to weave the skins a considerable distance apart such as the distance they will have in the finished preform so as to provide enough room for the web yarns during weaving. A typical arrangement is shown in FIG. 17. A former (or formers) is also used to control the distance between the skins, although it is not necessarily required to expand the preform.

It is desirable (especially in the case of substantial webs) that the lift of the healds is set such that the yarns are held in shedding positions between the skins (or between the flange skin and the means engaging the web yarns at the edge of the web in the case of a single flanged component) and are spread (preferably evenly) in a vertical direction as opposed to the conventional weaving practice of aligning them all at the same height. An example of this is shown in FIG. 18. 46a is a heald eye positioned at the top of the upper shed with a web yarn held in the top of the upper shed while 45a is a vacant top position in the upper shed which may be occupied by a heald eye at some other point in the weaving cycle. Similarly, 46b and 45b represent occupied and vacant positions in the lower shed. 46b is in the top position of the lower shed and 45b in the bottom position of the lower shed. The dotted circles 47 are vacant positions between the upper and lower sheds, and lower sheds, and 48 are occupied heald eye positions between the sheds. These positions are vertically distributed to ease the congestion of web yarns in this region.

Figure 20D:
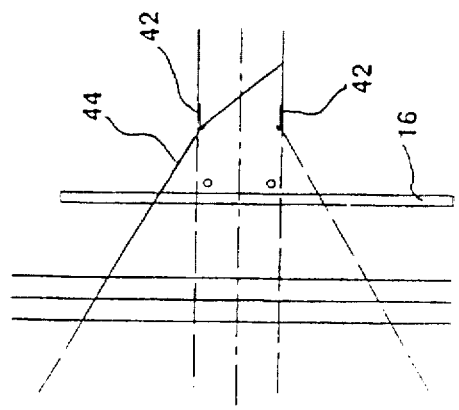
Figure 20C:
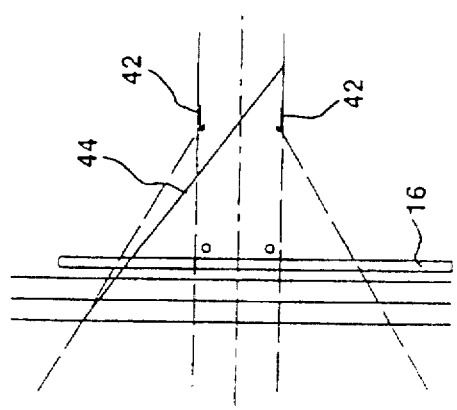
Figure 20B:
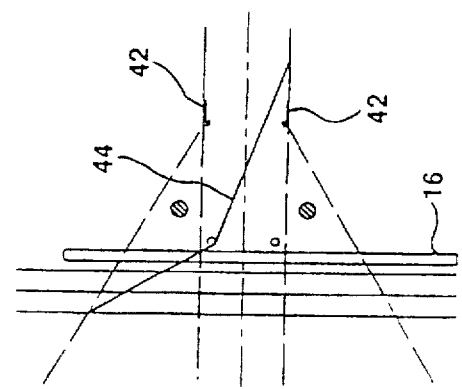
Figure 20A:
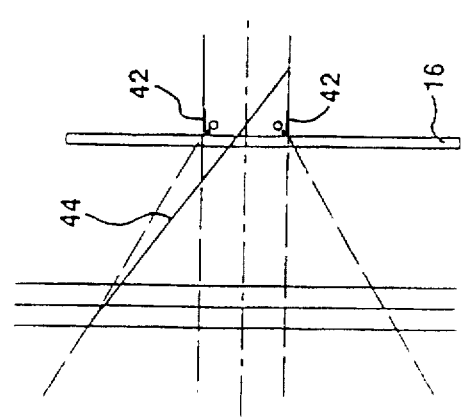

In the case of multiply flanged components, it is necessary to transfer yarns from shedding positions in one skin to shedding positions in the other skin. This can be achieved with a high lift and three or more shedding positions on the healds concerned or alternatively by a shed to shed transfer mechanism such as that shown in FIG. 19. This mechanism employees a pin 40 actuated back and forth by, for example, an air cylinder 41. The pin and cylinder are mounted on the reed or sley motion 16 and arranged so as to carry a web yarn towards the new skin and latch it onto a hook 42 where it will remain until woven into the new skin whereupon it will be carried forward with the new preform and released from the hook. The process by which a yarn is transferred from one skin to another is illustrated in FIGS. 20a to d. In FIG. 20a the yarn to be transferred 44 is moved to a position high enough to be picked up by the pin 40 while the reed is forward. The pin 40 is positioned across the reed dent 43 and as the reed comes back the pin deflects the yarn 44 away from the preform and holds it out of the shed to allow the clear passage of the rapier (see FIG. 20b). As the rapier retracts from the shed, the pin 40 is retracted allowing the yarn 44 to adopt the new position shown in FIG. 20c. The pin is then repositioned (extended) across the reed dent before the reed moves forward whereupon it carries by virtue of its tension the yarn with it towards the preform. The hook 42 is mounted on the former 30 or external to the preform and is arranged so as to capture the yarn as it is presented by pin 40 in latching fashion. As the reed returns in preparation for the next insertion, the yarn remains latched on the hook as shown in FIG. 20d. Similar yarn transfer mechanisms may be arranged to work separately from the reed motion. The air supply for the pneumatic cylinder can be routed through the healds and the reed.

In the case of preforms with two or more flanges and one or more webs, the geometry of the upper shed (21a) and the lower shed (21b) bust be chosen to ensure that the tension in the warp yarns in the flanges is sufficient to keep the flanges in contact with the depth stops (20a and 20b) despite the tension in the web yarns which tends to draw the flanges together.

In the case of performs within which the distance between the flanges varies when measured at different points along a web such as that shown in FIGS. 9 and 10, the taper may be achieved by varying the distance between the depth stops (20a and 20b) as the preform is produced or by producing the preform with initially parallel flanges and then, in a subsequent operation, drawing the yarns of said web out from the ends of the said preform so as to cause the flanges to move closer together and take up the desired profile. Alternatively, if loops are left in the web yarns the flanges may be drawn further apart, by taking-up the slack in the loops.

We claim:

1. A fibre preform comprising at least one flange including a plurality of yarns at least one web woven in one piece with the flange or flanges, in which the or each web includes a plurality of yarns each of which extends repeatedly from a said flange to a free edge of the web or to another flange so as to be interlocked therewith, the preform being woven such that at least some of the web yarns zig zag along the web by repeatedly extending alternately from the flange at a first angle to the plane of the flange and returning to the flange at a second angle to the plane of the flange, the web yarns forming a transversely concentrated substantially continuous wall of fibre.

2. A fibre preform comprising at least one flange including a plurality of yarns and at least one web woven in one piece with the flange or flanges, in which the or each web contains a plurality of yarns each of which extends repeatedly from a said flange to a free edge of the web or to another flange, each said yarn extending through one surface of the flange and between yarns of the flange so as to be interlocked therewith but without extending to the opposite surface of the flange, the preform being woven such that at least some of the web yarns zig zag along the web by repeatedly extending alternatively from the flange at a first angle to the plane of the flange and returning to the flange at a second angle to the plane of the flange.

3. A fibre preform comprising at least one flange including interwoven longitudinally extending and transversely extending structural yarns and at least one web woven in one piece with the flange or flanges, in which the or each web contains a plurality of structural yarns each of which extends repeatedly from a said flange to a free edge of the web or to another flange, each said yarn extending between the yarns of the flange so as to be interlocked therewith, the preform being woven such that at least some of the web yarns zig zag along the web by repeatedly extending alternatively from the flange at a first angle to the plane of the flange and returning to the flange at a second angle to the plane of the flange, the interweaving of the flange yarns being non-constant as between one location and another in the flange.

4. A fibre preform as claimed in claim 1, wherein the first and second angles are equal but of opposite sense.

5. A fibre preform as claimed in claim 1, in which the or each flange comprises a plurality of yarns extending in the longitudinal direction interwoven with a plurality of transversely extending yarns.

6. A fibre preform as claimed in claim 3, in which the longitudinally extending yarns, and the yarns forming the web, are warp yarns and the transversely extending yarns are weft yarns.

7. A fibre preform as claimed in claim 3, in which the longitudinally extending yarns of the or each flange and the web yarns are weft yarns, the transversely extending yarns of the or each flange being warp yarns.

8. A fibre preform as claimed in claim 1, with two or more flanges which are not parallel to each other.

9. A fibre preform as claimed in claim 1, in which the preform is curved in the plane of a web.

10. A fibre preform as claimed in claim 1, containing two or more flanges and one or more webs.

11. A fibre preform as claimed in claim 1, which contains glass fibre.

12. A fibre preform as claimed in claim 1, wherein the distance between any two adjacent flanges when measured in the plane of a web linking said flanges or, in the case of a singly flanged component, the distance between a flange and the extreme edge of a web, measured in the plane of said web, exceeds 5 millimeters at any part of the web.

13. A structural composite component comprising a preform as claimed in claim 1, embedded in a matrix material.

14. A component as claimed in claim 13, wherein the ratio of the volume of fibre in a web to the total volume of said web exceeds 0.1 when measured after the matrix material has been fixed.

15. A component as claimed in claim 14, wherein the ratio of the volume of fibre in a web to the total volume of said web exceeds 0.25 when measured after the matrix material has been fixed.

16. A component as claimed in claim 15, wherein the ratio of the volume of fibre in a web to the total volume of said web exceeds 0.4 when measured after the matrix material has been fixed.

17. A method of manufacturing a fibre preform according to claim 1, the method comprising weaving a said flange and establishing the web yarns by interlocking them with the flange yarns and engaging the web yarns at a plurality of points spaced longitudinally of the preform during weaving thereof said points being spaced from the flange yarns in the direction of the web to define the required web dimension.

18. A method as claimed in claim 17, wherein the web yarns are engaged at longitudinally spaced points close to the flange yarns, said points being progressively moved away from the flange yarns to draw out the web yarns.

19. A method as claimed in claim 18, comprising engaging said web yarns at a controlled distance from the flange yarns during weaving and maintaining said engagement during sufficient longitudinal movement of the woven preform so that the web yarns are locked and upon disengagement of the web yarns are not drawn back into the preform.

20. A method as claimed in claim 19, comprising engaging the web yarns by interlocking them with a further flange adjacent the first flange during weaving thereof and then progressively separating the first and further flanges.

21. A method as claimed in claim 17, wherein the web yarns are transferred alternately between shedding positions for first flange and further positions corresponding to the said points spaced from the flange yarns.

22. A method as claimed in claim 21, wherein at least some of the web yarns are held in one or more shedding positions intermediate the shedding positions for the first flange and the further positions.

23. A method of manufacturing a fibre preform comprising at least one flange including a plurality of yarns and at least one web woven in one piece with the flange or flanges, in which the or each web contains a plurality of yarns each of which extends repeatedly from a said flange to a free edge of the web or to another flange, each said yarn extending between yarns of the flange so as to be interlocked therewith, the preform being woven such that at least some of the web yarns zig zag along the web by repeatedly extending alternatively from the flange at a first angle to the plane of the flange, the method comprising weaving a said flange and establishing the web yarns by interlocking them with the flange yarns, engaging the web yarns at a plurality of points spaced longitudinally of the preform during weaving thereof, said points being spaced from the flange yarns in the direction of the web to define the required web dimension, transferring the web yarns alternatively between shedding positions for the flange and further shedding positions corresponding to the said points spaced from the flange yarns, and holding some of the yarns in shedding positions intermediate the flange shedding position and the further shedding positions.

24. A method as claimed in claim 23, wherein there are a plurality of said intermediate shedding positions spaced at equal intervals.

25. A method as claimed in claim 23, wherein the said points are spaced from the flange yarns by a constant distance substantially equal to the required web dimension.

26. A method as claimed in claim 23, comprising weaving the first flange and a further flange at a distance apart defining the required web dimensions, disposing web yarns between the flanges and engaging the web yarns by interlocking them with the further flange.

27. A method as claimed in claim 23, comprising deflecting a web yarn at a point intermediate its heald and the preform to permit passage of a weft yarn.

28. A method as claimed in claim 23, comprising postforming the preform to a curved shape after weaving thereof.

29. Apparatus for manufacturing a fibre preform comprising at least a first flange including a plurality of yarns and at least one web woven in one piece with the flange or flanges, in which the or each web contains a plurality of yarns each of which extends repeatedly from the first flange to a free edge of the web or to another flange, each said yarn extending between yarns of the first flange to as to be interlocked therewith, the preform being woven such that at least some of the web yarns zig zag along the web by repeatedly extending alternately from the flange at a first angle to the plane of the flange and returning to the flange at a second angle to the plane of the flange, means for weaving the first flange, means for interlocking web yarns with the flange yarns and engagement means for engaging the web yarns at a plurality of points spaced longitudinally of the yarns at a plurality of points spaced longitudinally of the preform during weaving thereof, said points being spaced from the flange yarns in the direction of the web to define the required web dimension.

30. Apparatus as claimed in claim 29, wherein the engagement means comprises for moving said points of engagement of the web yarns from initial positions close to the flange yarns progressively away from the flange yarns to draw-out the web yarns.

31. Apparatus as claimed in claim 29, wherein the engagement means is adapted to engage said yarns at a controlled distance from the web yarns and to maintain said engagement during longitudinal movement of the preform until the woven web yarns are no longer under tension from yet to be woven web yarn.

32. Apparatus as claimed in claim 30, comprising means for weaving a further flange adjacent the first flange, the engagement means being adapted to interlock the web yarns with the further flange, and means for progressively separating the first and further flanges.

33. Apparatus as claimed in claim 29, comprising holding means for holding at least some of the web yarns in one or more shedding positions intermediate the shedding positions for the first flange and the further positions.

34. Apparatus as claimed in claim 33, wherein the engagement means are adapted to engage the web yarns at a distance substantially equal to the required web dimension.

35. Apparatus as claimed in claim 33, comprising means for weaving a further flange at a controlled distance from the first flange to define the web dimension, and means for disposing the web yarns between the flanges, the engagement means being adapted to interlock the web yarns with the yarn of the further flange.

36. Apparatus as claimed in claim 35, wherein the means for disposing the web yarns comprises means for transferring the web yarns between shedding positions in the first flange and shedding positions in the further flange.

37. Apparatus as claimed in claim 29, comprising means for deflecting a web yarn at a point intermediate a heald through which the yarn passes and the preform to permit passage of a weft yarn.

38. Apparatus as claimed in claim 37, comprising means for first deflecting the web yarn away from the preform in a direction longitudinally thereof to permit passage of a weft yarn and for thereafter deflecting the web yarn towards the preform, and means for retaining the web yarn after deflection towards the preform.

39. Apparatus as claimed in claim 37, wherein the means for deflecting the web yarn is a retractable member extensible transversely in front of the preform and moveable back and forth longitudinally thereof.

\* \* \* \* \*

UNITED STATES PATENT AND TRADEMARK OFFICE
CERTIFICATE OF CORRECTION

PATENT NO.   : 5,783,279
DATED        : July 21, 1998
INVENTOR(S)  : Raymond Edgson et al It is certified that error appears in the above-indentified patent and that said Letters Patent is hereby corrected as shown below:

Col. 11, line 11 - after "yarns" insert --and--.

Col. 13, line 43 - after "comprises" insert --means--.

Signed and Sealed this

Eleventh Day of May, 1999

Attest:

Q. TODD DICKINSON

*Attesting Officer*    *Acting Commissioner of Patents and Trademarks*